US012791683B2

(12) United States Patent
Warshowsky

(10) Patent No.: US 12,791,683 B2
(45) Date of Patent: Nov. 10, 2026

(54) SYSTEMS AND METHODS FOR LIDAR MEASUREMENT WITH REDUCED PEAK-FITTING BIAS

(71) Applicant: Aurora Operations, Inc., Pittsburgh, PA (US)

(72) Inventor: Philip Warshowsky, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 84 days.

(21) Appl. No.: 18/824,078

(22) Filed: Sep. 4, 2024

(65) Prior Publication Data

US 2026/0063773 A1 Mar. 5, 2026

(51) Int. Cl.

*G01S 7/4865* (2020.01)
*B60W 60/00* (2020.01)
*G01S 17/931* (2020.01)

(52) U.S. Cl.

CPC ......... *G01S 7/4866* (2013.01); *B60W 60/001* (2020.02); *G01S 17/931* (2020.01); *B60W 2420/408* (2024.01); *B60W 2554/4042* (2020.02); *B60W 2554/802* (2020.02); *B60W 2710/18* (2013.01); *B60W 2710/20* (2013.01)

(58) Field of Classification Search

CPC .. G01S 7/4866; G01S 17/931; B60W 60/001; B60W 2420/408; B60W 2554/4042; B60W 2554/802; B60W 2710/18; B60W 2710/20

USPC .......................................................... 701/28

See application file for complete search history.

(56) References Cited

U.S. PATENT DOCUMENTS

| | | | | |
|---|---|---|---|---|
| 10,473,770 | B1 * | 11/2019 | Zhu | G01S 17/931 |
| 2002/0126039 | A1 * | 9/2002 | Dalton | G01S 13/524 342/195 |
| 2008/0219466 | A1 * | 9/2008 | Pishehvar | G10L 19/0212 704/E19.02 |
| 2014/0193076 | A1 * | 7/2014 | Gardiner | G06T 9/00 382/190 |
| 2018/0357554 | A1 * | 12/2018 | Hazan | G06V 10/776 |
| 2019/0011558 | A1 * | 1/2019 | Crouch | G08G 1/16 |
| 2020/0278431 | A1 * | 9/2020 | Zhu | G01S 17/10 |
| 2020/0326423 | A1 * | 10/2020 | Maor | G01S 13/42 |
| 2022/0206149 | A1 * | 6/2022 | Boloorian | G01S 7/4915 |
| 2023/0003889 | A1 * | 1/2023 | DeWeert | G06T 17/05 |
| 2024/0079841 | A1 * | 3/2024 | Li | H01S 3/0912 |
| 2024/0337735 | A1 * | 10/2024 | Rapp | G01S 7/4913 |

* cited by examiner

*Primary Examiner* — Tuan C To
*Assistant Examiner* — Dominick Mulder
(74) *Attorney, Agent, or Firm* — Dority & Manning, P.A.

(57) ABSTRACT

A LIDAR sensor system includes one or more processors. The processors transmit a signal to an environment of the LIDAR sensor system, receive, from an object in the environment, a return signal in response to transmitting the signal, determine correlation data between the signal and the return signal, identify, in the correlation data, an initial location of a peak, convolve the correlation data with a predetermined function to refine the initial location of the peak, and in response to the refined location of the peak, determine at least one of a distance to the object from the LIDAR sensor system or a velocity of the object.

20 Claims, 13 Drawing Sheets

SYSTEMS AND METHODS FOR LIDAR MEASUREMENT WITH REDUCED PEAK-FITTING BIAS

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect of the present application relates to a LIDAR sensor system including one or more processors; and one or more computer-readable storage mediums storing instructions which, when executed by the one or more processors, cause the one or more processors to: transmit a signal to an environment of the LIDAR sensor system; receive, from an object in the environment, a return signal in response to transmitting the signal; determine correlation data between the signal and the return signal; identify, in the correlation data, an initial location of a peak; convolve the correlation data with a predetermined function to refine the initial location of the peak; and in response to the refined location of the peak, determine at least one of a distance to the object from the LIDAR sensor system or a velocity of the object.

At least one aspect of the present application relates to an autonomous vehicle control system including: one or more processors; and one or more computer-readable storage mediums storing instructions which, when executed by the one or more processors, cause the one or more processors to: transmit a signal to an environment of the LIDAR sensor system; receive, from an object in the environment, a return signal in response to transmitting the signal; determine correlation data between the signal and the return signal; identify, in the correlation data, an initial location of a peak; convolve the correlation data with a predetermined function to refine the initial location of the peak; in response to the refined location of the peak, determine at least one of a distance to the object from the LIDAR sensor system or a velocity of the object; and control operation of a vehicle, based at least in part on a determination of the at least one of the distance or the velocity of the object in the environment.

At least one aspect of the present application relates to an autonomous vehicle. The autonomous vehicle includes a LIDAR sensor system including one or more processors; and one or more computer-readable storage mediums storing instructions which, when executed by the one or more processors, cause the one or more processors to: transmit a signal to an environment of the LIDAR sensor system; receive, from an object in the environment, a return signal in response to transmitting the signal; determine correlation data between the signal and the return signal; identify, in the correlation data, an initial location of a peak; convolve the correlation data with a predetermined function to refine the initial location of the peak; and in response to the refined location of the peak, determine at least one of a distance to the object from the LIDAR sensor system or a velocity of the object. The autonomous vehicle includes a steering system; a braking system; and a vehicle controller including one or more processors configured to control operation of at least one of the steering system or the braking system based at least in part on a determination of the at least one of the distance or the velocity of the object in the environment.

At least one aspect of the present application relates to a method for operating a LIDAR system, including: transmitting a signal to an environment of the LIDAR sensor system; receiving, from an object in the environment, a return signal in response to transmitting the signal; determining correlation data between the signal and the return signal; identifying, in the correlation data, an initial location of a peak; convolving the correlation data with a predetermined function to refine the initial location of the peak; and in response to the refined location of the peak, determining at least one of a distance to the object from the LIDAR sensor system or a velocity of the object.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR sensor system can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

A LIDAR sensor system can be susceptible to a peak-fitting bias in correlating a transmitted signal and a return signal and fitting a result thereof. Although the LIDAR sensor system can filter (e.g., remove, ignore, etc.) the bias, the performance of such a filtering method can be reduced when, for example, the signals contain noise, and can be even worse (e.g., more biased) in low signal to noise ratio (SNR) conditions.

The present disclosure provides techniques for reducing the peak-fitting bias. According to some illustrative implementations, the LIDAR sensor systems disclosed herein can determine correlation data between the transmitted signal and the return signal, identify an initial location of a peak, and convolve the correlation data with a predetermined function. In some implementations, the predetermined function may be a Gaussian function, a Lorentzian function, a polynomial function, or a raised cosine, can be selected based on the SNR conditions. This allows for the location of the peak to be identified more accurately, which contributes to accuracy and reliability of the LIDAR sensor systems.

1. System Environments for Autonomous Vehicles

Figure 1A:
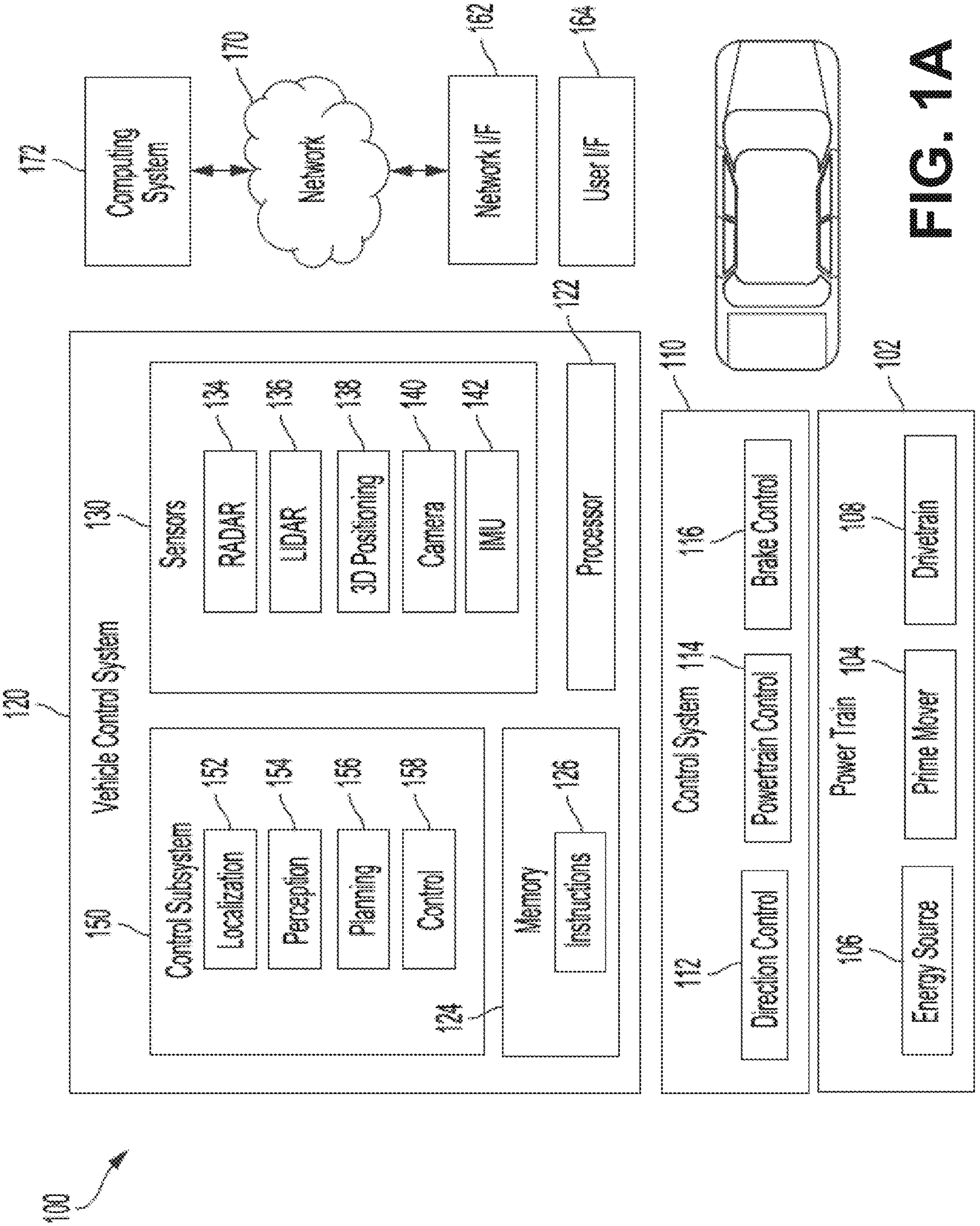
FIG. 1A is a block diagram illustrating an example of a system environment for autonomous vehicles according to some implementations.

FIG. 1A is a block diagram illustrating an example of a system environment for autonomous vehicles according to some implementations. FIG. 1A depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processor(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1A can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received through (e.g., by way of) another computer or electronic device, e.g., through an app on a mobile device or through a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 through the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 through network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 3A:
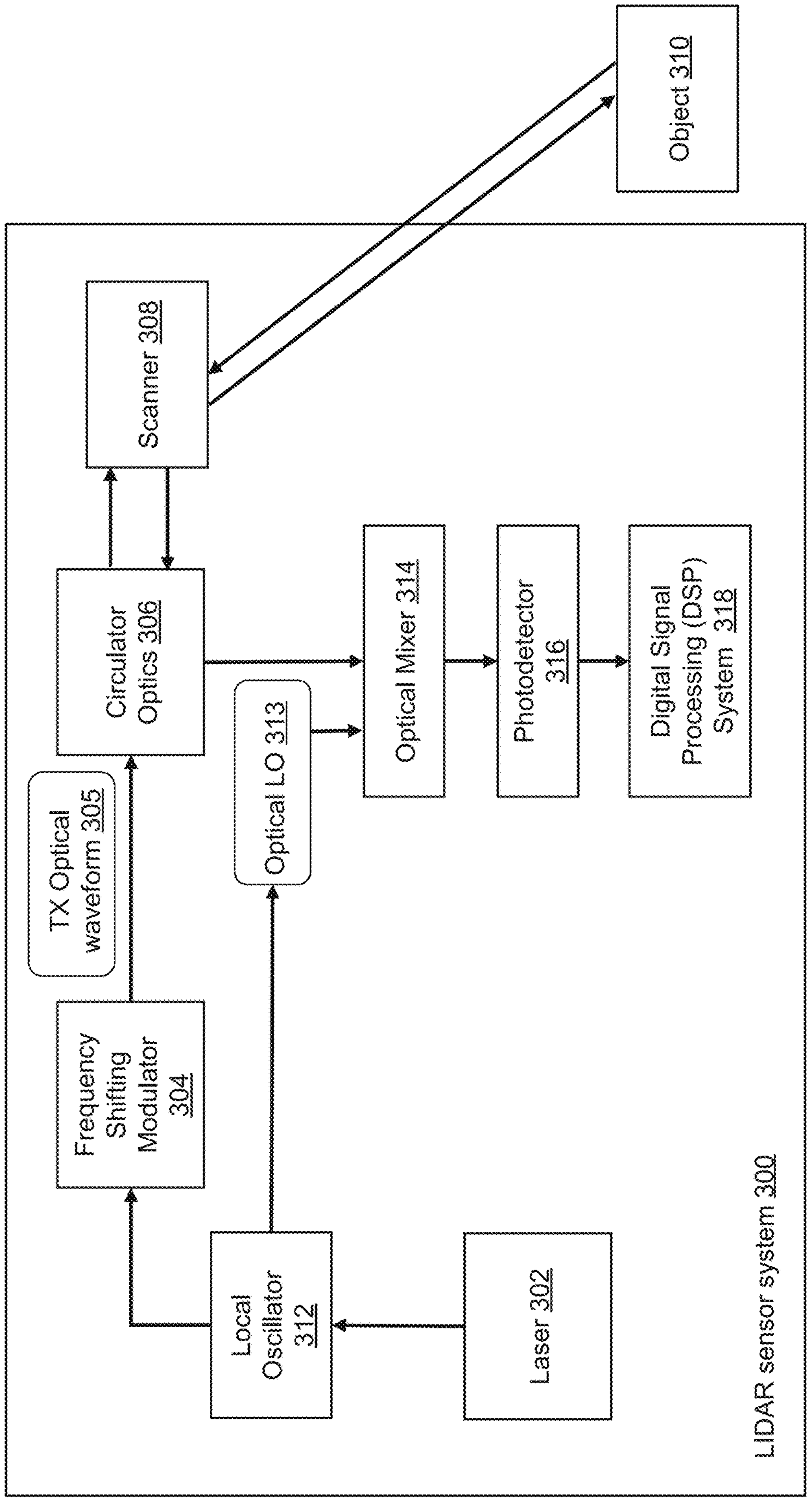
FIG. 3A is a block diagram illustrating an example of a lidar sensor system, according to some implementations.

A truck can include a LIDAR system (e.g., vehicle control system 120 in FIG. 1A, LIDAR sensor system 300 in FIG. 3A, among others described herein). In some implementations, the LIDAR sensor system 300 can use frequency modulation to encode an optical signal and scatter the encoded optical signal into free-space using optics. By detecting the frequency differences between the encoded optical signal and a return signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1A) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectivity object beyond 300 meters, and a high reflectivity object beyond 400 meters.

To achieve such improvements in detection capability, the FM LIDAR sensor system may use sensors (e.g., sensors 130 in FIG. 1A). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5602 nm; and far infrared: 5602 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this "noise."

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

3. Commercial Trucking

Figure 1B:
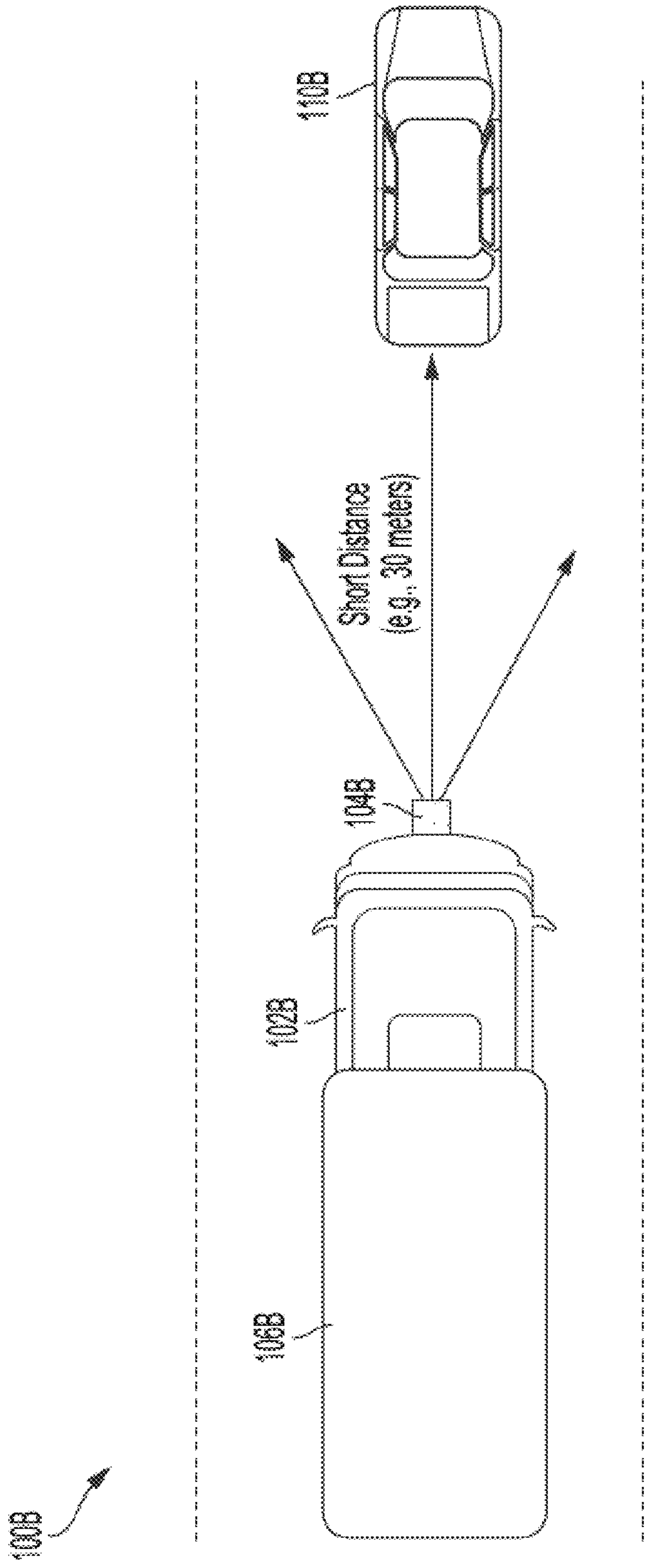
FIG. 1B is a block diagram illustrating an example of a system environment for autonomous commercial trucking vehicles according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or products. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1A, LIDAR sensor system 300 in FIG. 3A) for determining a distance to the object 110B and/or measuring the velocity of the object 110B. Although FIG. 1B shows that one LIDAR sensor system 104B is mounted on the front of the commercial truck 102B, the number of LIDAR sensor systems and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 1C:
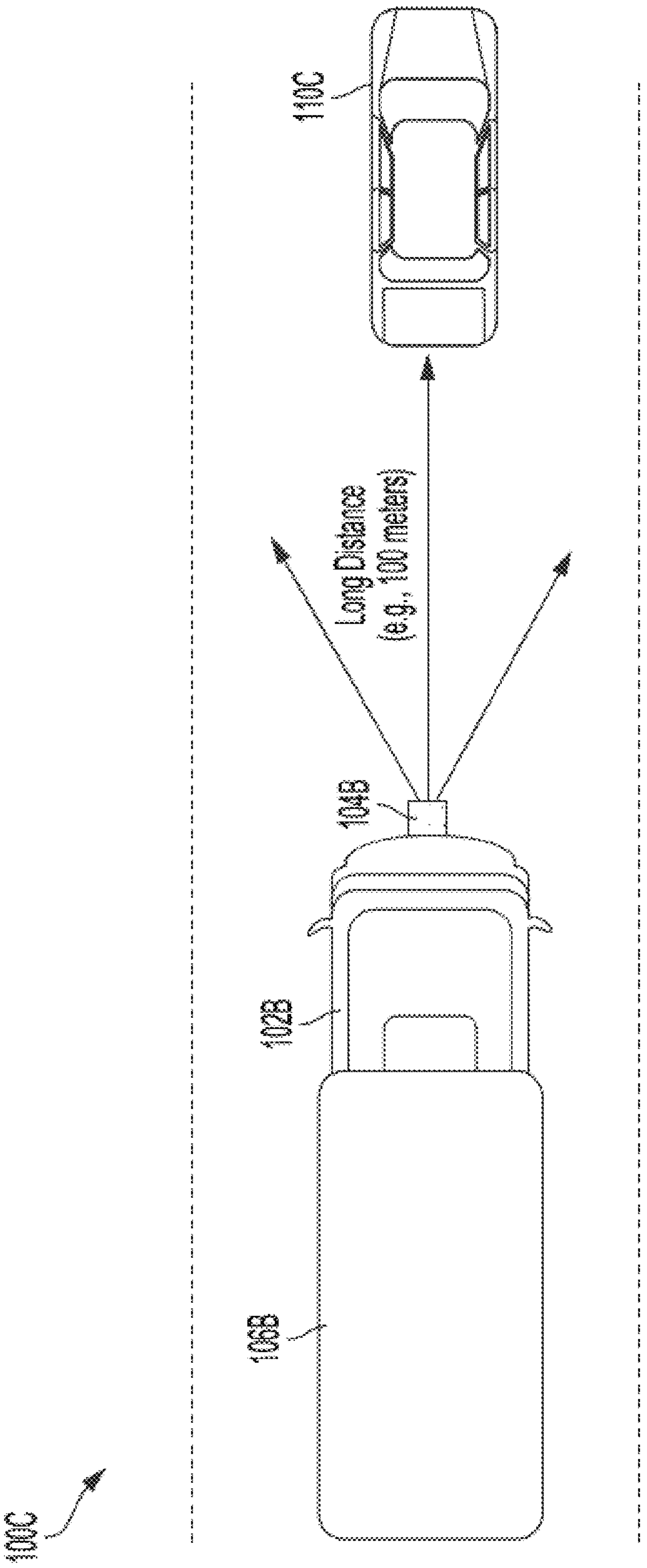
FIG. 1C is a block diagram illustrating an example of a system environment for autonomous commercial trucking vehicles according to some implementations.

FIG. 1C is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 1D:
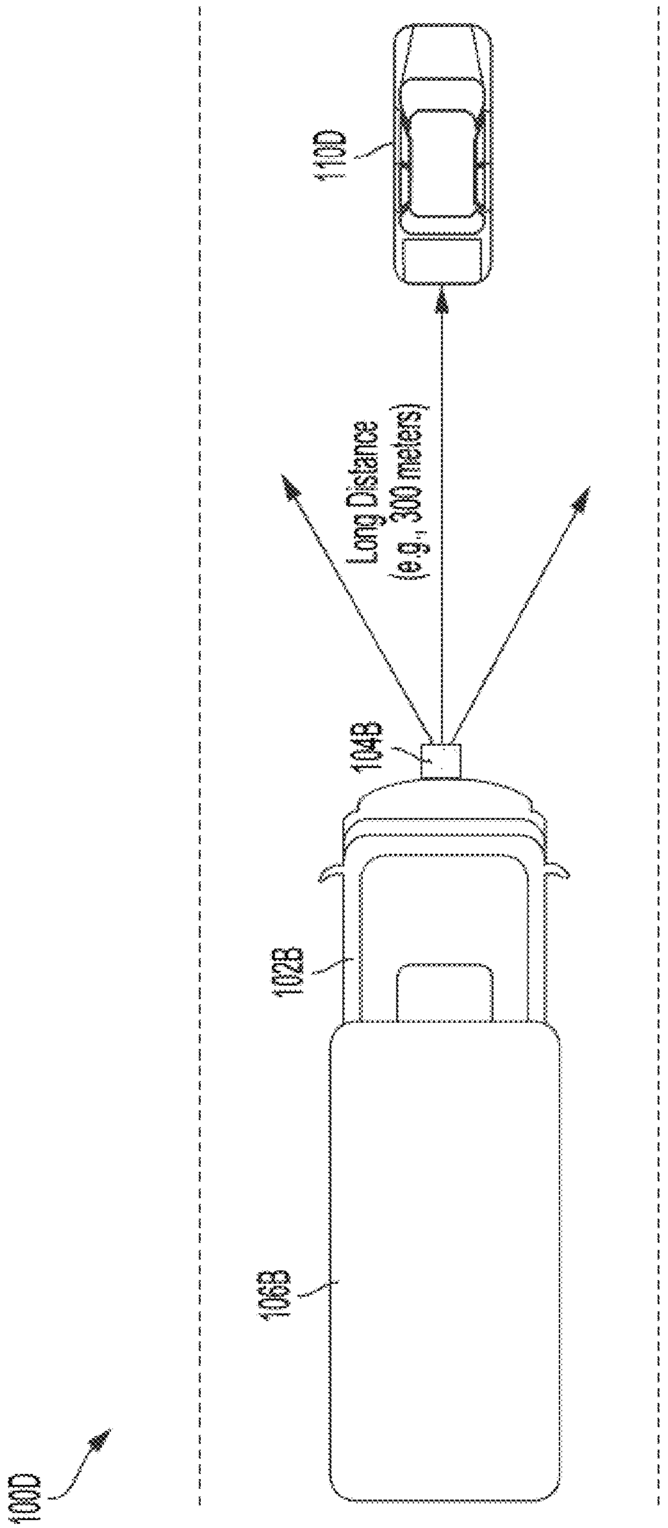
FIG. 1D is a block diagram illustrating an example of a system environment for autonomous commercial trucking vehicles according to some implementations.

FIG. 1D is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 1D as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

4. Measurement of Range Using Optical Phase-Encoded Signals

Figure 2A:
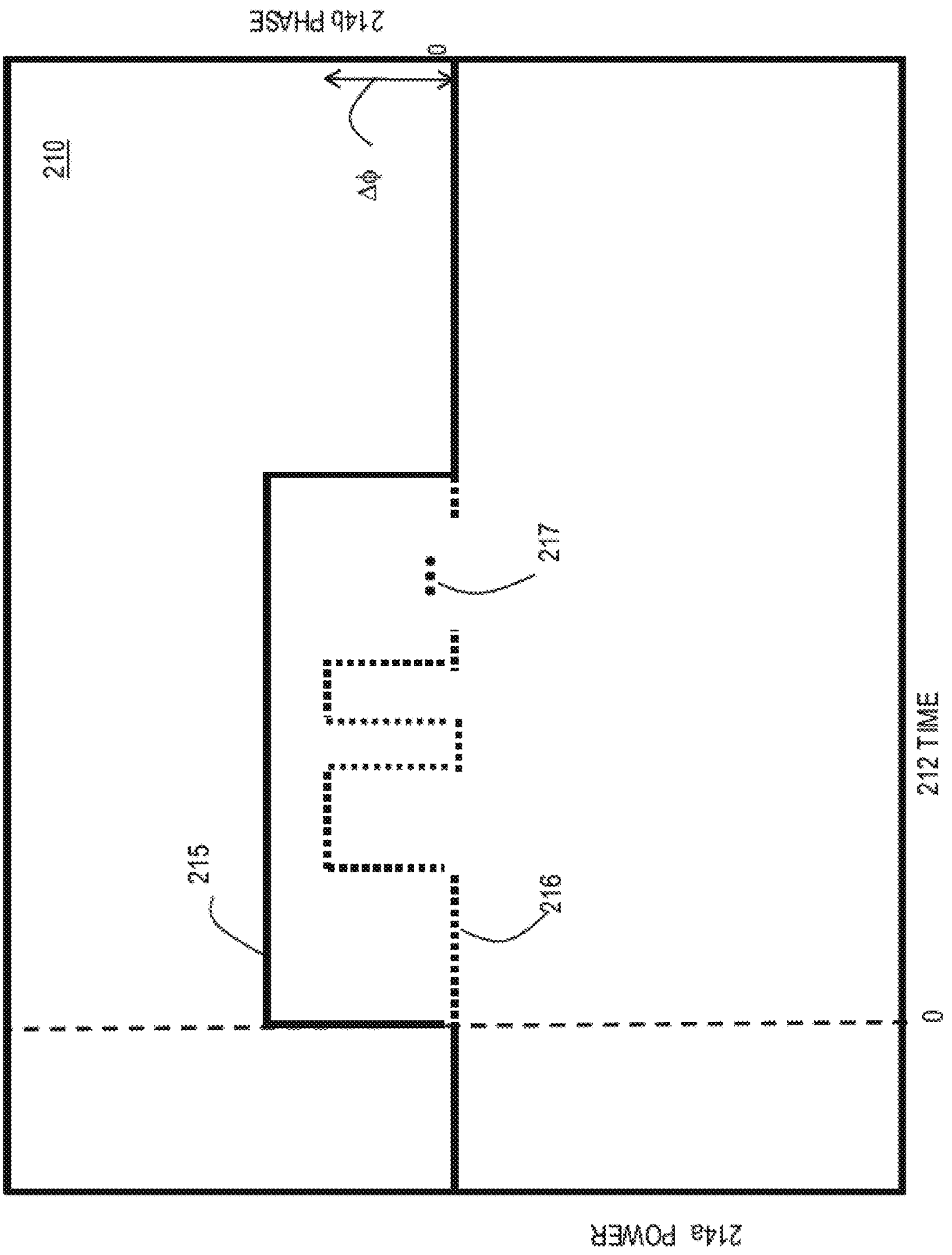
FIG. 2A is a schematic graph that illustrates an example transmitted optical phase-encoded signal for measurement of range, according to some implementations.

FIG. 2A is a schematic graph 210 that illustrates a transmitted optical phase-encoded signal for measurement of range, according to an embodiment. The horizontal axis 212 indicates time in arbitrary units from a start time at zero. The left vertical axis 214*a* indicates power in arbitrary units during a transmitted signal; and the right vertical axis 214*b* indicates phase of the transmitted signal in arbitrary units. To simply illustrate the technology of phase-encoded LIDAR, binary phase encoding is demonstrated. Trace 215 indicates the power relative to the left axis 214*a* and is constant during the transmitted signal and falls to zero outside the transmitted signal. Dotted trace 216 indicates phase of the signal relative to a continuous wave signal.

As can be seen, the trace is in phase with a carrier (phase=0) for part of the transmitted signal and then changes by $\Delta\varphi$ (phase=$\Delta\varphi$) for short time intervals, switching back and forth between the two phase values repeatedly over the transmitted signal as indicated by the ellipsis 217. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. As used herein, the "symbol" refers to a discrete phase state or change in phase to encode information in the transmitted optical signal. The duration of each symbol and the number of distinct phase states can determine the information content and baud rate of the signal. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\varphi$* {0, 1, 2 and 3}, which, for $\Delta\varphi=\pi/2$ (90 degrees), equals {0, $\pi/2$, $\pi$ and $3\pi/2$}, respectively; and thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave) as illustrated in FIG. 2A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (it is a non-coherent scheme).

For optical ranging applications, the carrier frequency is an optical frequency $f_C$ and a RF $f_r$ is modulated onto the optical carrier. The number N and duration $\tau$ of symbols are selected to achieve the desired range accuracy and resolution. The pattern of symbols is selected to be distinguishable from other sources of coded signals and noise. Thus, a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figure 2B:
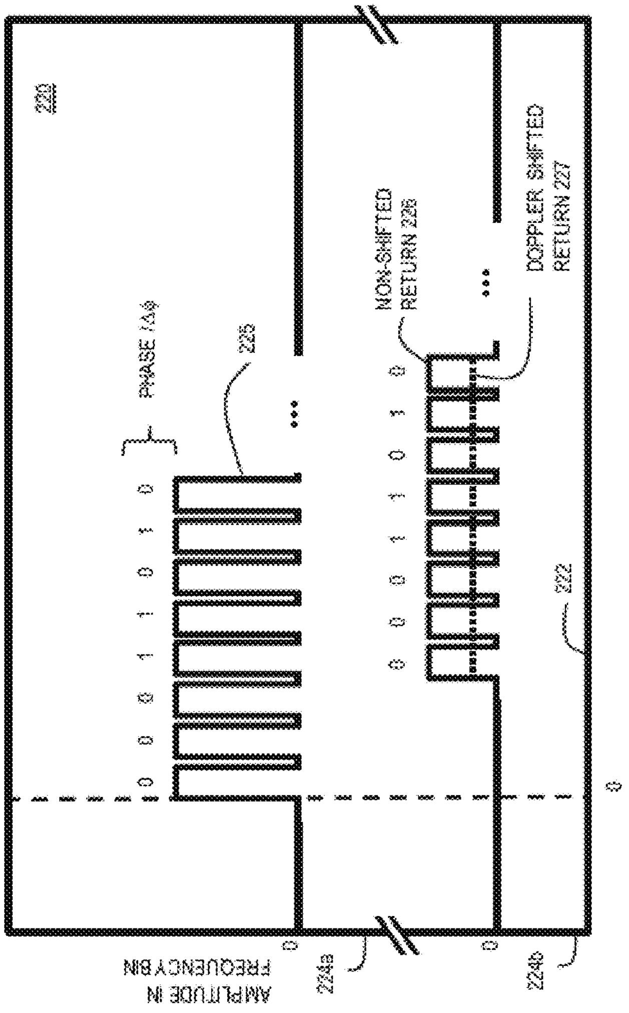
FIG. 2B is a schematic graph that illustrates the example transmitted signal of FIG. 2A as a series of binary digits along with returned optical signals for measurement of range, according to some implementations.

FIG. 2B is a schematic graph 220 that illustrates the example transmitted signal of FIG. 2A as a series of binary digits along with returned optical signals for measurement of range, according to an embodiment. The horizontal axis 222 indicates time in arbitrary units after a start time at zero. The vertical axis 224*a* indicates amplitude of an optical transmitted signal at frequency $f_c+f_r$ in arbitrary units relative to zero. The vertical axis 224*b* indicates amplitude of an optical returned signal at frequency $f_c+f_r$ in arbitrary units relative to zero, and is offset from axis 224*a* to separate traces. Trace 225 represents a transmitted signal of M*N binary symbols, with phase changes as shown in FIG. 2A to produce a code starting with 00011010 and continuing as indicated by ellipsis. Trace 226 represents an idealized (noiseless) return signal that is scattered from an object that is not moving (and thus the return is not Doppler shifted). The amplitude is reduced, but the code 00011010 is recognizable. Trace 227 represents an idealized (noiseless) return signal that is scattered from an object that is moving and is therefore Doppler shifted. The return is not at the proper optical frequency $f_c+f_r$ and is not well detected in the expected frequency band, so the amplitude is diminished.

The observed frequency f' of the return differs from the correct frequency $f=f_c+f_r$ of the return by the Doppler effect given by Equation 1.

$$f' = \frac{(c+v_o)}{(c+v_s)} f \qquad \text{(Equation 1)}$$

Where c is the speed of light in the medium. Note that the two frequencies are the same if the observer and source are moving at the same speed in the same direction on the vector between the two. The difference between the two frequencies, $\Delta f=f'-f$, is the Doppler shift, $\Delta f_D$, which causes problems for the range measurement, and is given by Equation 2.

$$\Delta f_D = \left[\frac{(c+v_o)}{(c+v_s)} - 1\right] f \qquad \text{(Equation 2)}$$

Note that the magnitude of the error increases with the frequency f of the signal. Note that for a stationary LIDAR system ($v_o=0$), for an object moving at 10 meters a second ($v_o=10$), and visible light of frequency about 500 THz, then the size of the error is on the order of 16 megahertz (MHz, 1 MHz=106 hertz, Hz, 1 Hz=1 cycle per second). In various embodiments described below, the Doppler shift error is detected and used to process the data for the calculation of range.

Figure 2C:
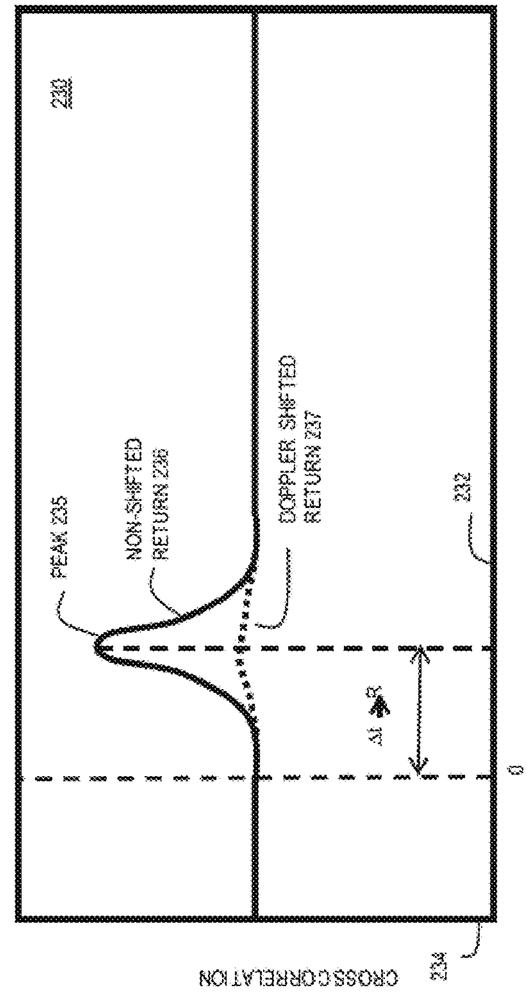
FIG. 2C is a schematic graph that illustrates example cross-correlations of a reference signal with two returned signals, according to some implementations.

FIG. 2C is a schematic graph 230 that illustrates example cross-correlations of the transmitted signal with two returned signals, according to an embodiment. In phase coded ranging, the arrival of the phase coded reflection is detected in the return by cross correlating the transmitted signal or other reference signal with the return signal, implemented practically by cross correlating the code for a RF signal with an electrical signal from an optical detector using heterodyne detection and thus down-mixing back to the RF band. In some implementations, this may include correlating a sequence of phases (or phase changes) of a particular frequency in a return signal with that in the transmitted signal. The horizontal axis 232 indicates a lag time in arbitrary units applied to the coded signal before performing the cross correlation calculation with the return signal. The vertical axis 234 indicates amplitude of the cross correlation computation. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms. More precise mathematical expressions for performing the cross correlation are provided for some example embodiments, below. In some implementations, the Doppler peak and/or its shift ($\Delta f_D$) can be used to correct the correlation computation and determine the correct range. This may be accomplished with an auto-correlation computation, e.g., using the computational efficiencies of a FFT and inverse FFT.

In some implementations, a long code, of duration $D=(M*N)*\tau$, may be encoded onto the transmitted light, and a return signal of the same length in time can be collected. Both the code and signal are broken into M shorter blocks of length N so that the correlation can be conducted several times on the same data stream and the results averaged to improve signal to noise ratio (SNR). Families of good binary spreading sequences with minimal auto-correlation side-lobes for communication systems and radar and LIDAR systems such as so-called "maximal-length sequences (m-sequences)" can provide the codes used for phase modulation of each block of the M blocks.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 236 represents cross correlation with an idealized (noiseless) return signal that is reflected from an object that is not moving (and thus the return is not Doppler shifted). A peak occurs at a time Δt after the start of the transmitted signal. This indicates that the return signal includes a version of the transmitted phase code beginning at the time Δt. The range R to the reflecting (or backscattering) object is computed from the two way travel time delay based on the speed of light c in the medium, as given by Equation 3A:

$$R = c * \Delta t/2 \quad \text{(Equation 3A)}$$

Trace 237 represents cross-correlation with a Doppler shifted return signal that is reflected from a moving object. The peak in the trace 237 is shifted from the expected position due to the Doppler effect altering the frequency of the return signal. This shift causes the peak to occur at a different time compared to the noiseless case (e.g., the trace 236), indicating that the frequency of the return signal differs from that of the transmitted signal. The range R can be adjusted to account for this Doppler shift, as given by Equation 3B:

$$R = c * \Delta t'/2 \quad \text{(Equation 3B)}$$

where Δt' is a time at which the peak occurs after the start of the transmitted signal.

Figure 2D:
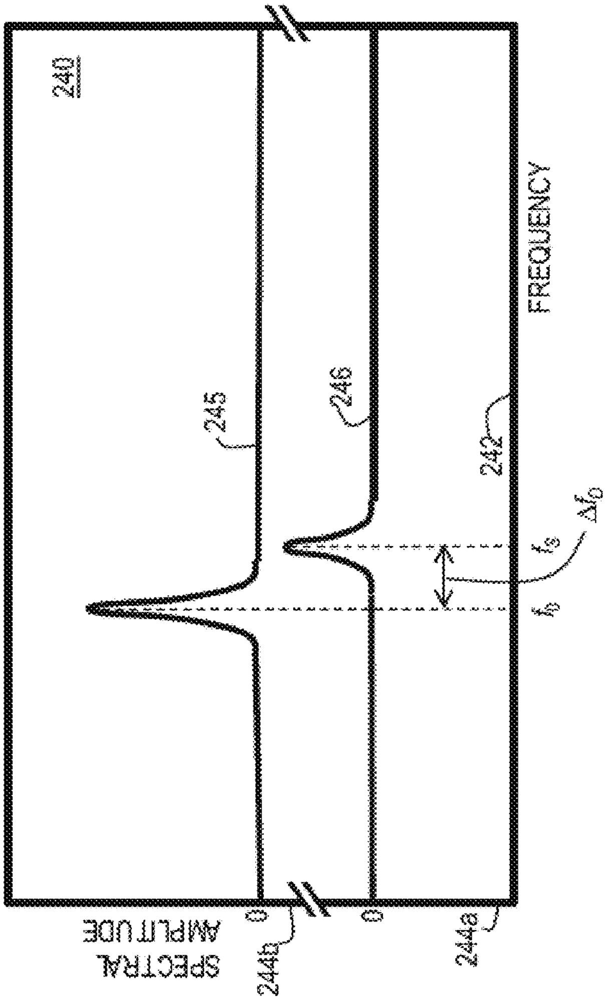
FIG. 2D is a schematic graph that illustrates an example spectrum of the reference signal and an example spectrum of a Doppler shifted return signal, according to some implementations.

According to various embodiments described in more detail below, the Doppler shift is determined in the electrical processing of the return signal; and the Doppler shift is used to correct the cross correlation calculation. Thus, a peak is more readily found and range can be more readily determined. FIG. 2D is a schematic graph 240 that illustrates an example spectrum of the transmitted signal and an example spectrum of a Doppler shifted return signal, according to an embodiment. The horizontal axis 242 indicates RF frequency offset from an optical carrier $f_c$ in arbitrary units. The vertical axis 244*a* indicates amplitude of a particular narrow frequency bin, also called spectral density, in arbitrary units relative to zero. The vertical axis 244*b* indicates spectral density in arbitrary units relative to zero, and is offset from axis 244*a* to separate traces. Trace 245 represents a transmitted signal; and a peak occurs at the proper RF $f_0$. Trace 246 represents an idealized (noiseless) return signal that is backscatter from an object that is moving and is therefore Doppler shifted. The return does not have a peak at the proper RF $f_0$; but, instead, is blue shifted by $\Delta f_D$ to a shifted frequency $f_S$.

Figure 2E:
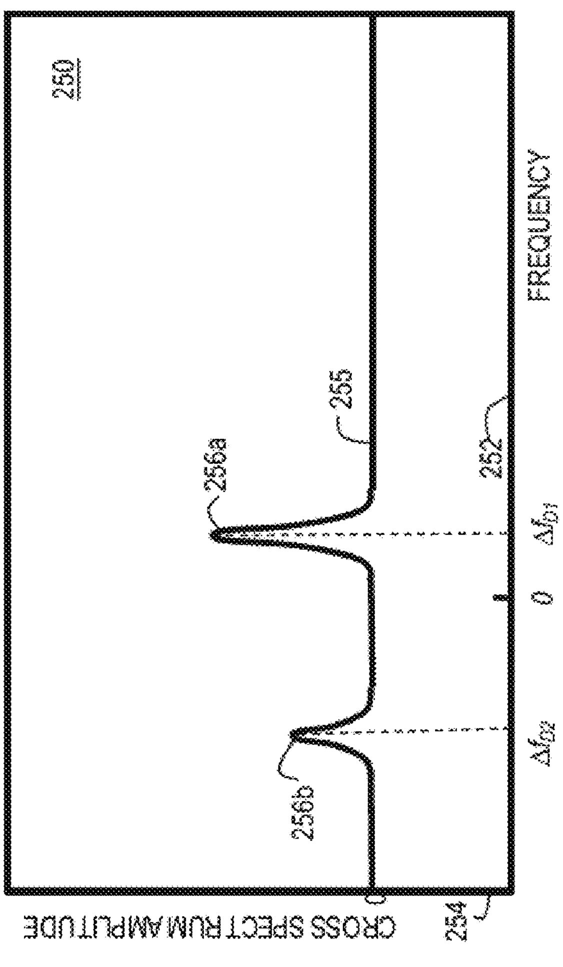
FIG. 2E is a schematic graph that illustrates an example cross-spectrum of phase components of a Doppler shifted return signal, according to some implementations.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 2D, it is more efficient to take the cross spectrum of the in-phase and quadrature component of the down-mixed returned signal in the RF band. FIG. 2E is a schematic graph 250 that illustrates an example cross-spectrum, according to an embodiment. The horizontal axis 252 indicates frequency shift in arbitrary units relative to the transmitted signal; and the vertical axis 254 indicates amplitude of the cross spectrum in arbitrary units relative to zero. Trace 255 represents a cross spectrum with an idealized (noiseless) return signal generated by one object moving toward the LIDAR system (blue shift of $\Delta f_{D1} = \Delta f_D$ in FIG. 2D) and a second object moving away from the LIDAR system (red shift of $\Delta f_{D2}$). A peak occurs when one of the components is blue shifted $\Delta f_{D1}$; and another peak occurs when one of the components is red shifted $\Delta f_{D2}$. Thus, the Doppler shifts are determined. These shifts can be used to determine a velocity of approach of objects in the vicinity of the LIDAR, as can be critical for collision avoidance applications.

As described in more detail below, the Doppler shift(s) detected in the cross spectrum are used to correct the cross correlation so that a Doppler compensated peak is apparent in the Doppler compensated Doppler shifted return at lag Δt, and range R can be determined. The information needed to determine and compensate for Doppler shifts is either not collected or not used in prior phase-encoded LIDAR systems.

Figure 3B:
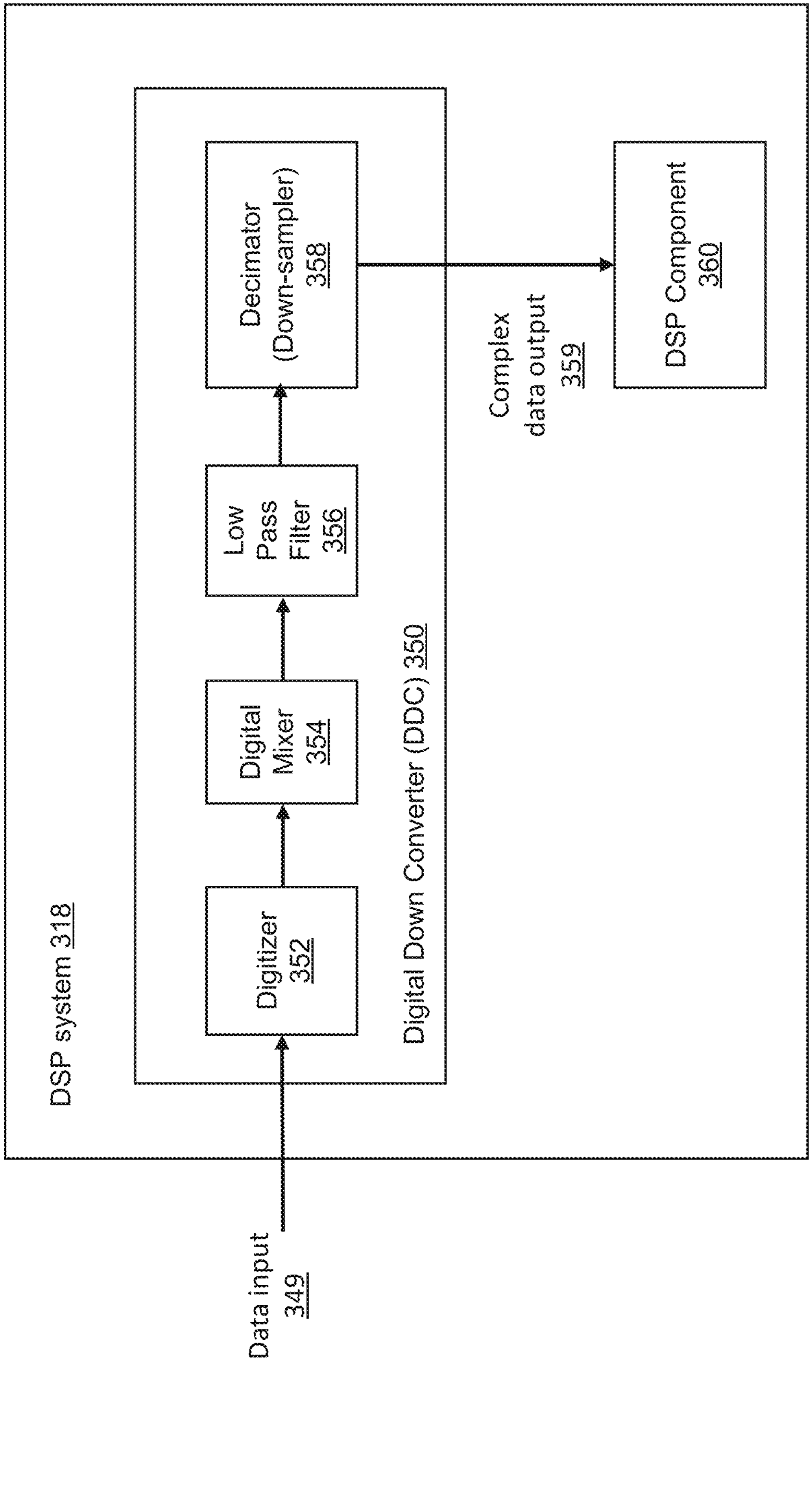
FIG. 3B is a block diagram illustrating an example of a digital signal processing system in a lidar sensor system, according to some implementations.

FIG. 3A is a block diagram illustrating an example of a LIDAR sensor system 300, according to some implementations. The LIDAR sensor system 300 may include a laser source 302, a local oscillator 312, a frequency-shifting optical modulator 304, circulator optics 306, a scanner 308, an optical mixer 314, one or more detectors 316 (e.g., a pair of detectors), and a DSP system 318. FIG. 3B is a block diagram illustrating an example of the DSP system 318 in a lidar sensor system, according to some implementations. The DSP system 318 may include a DDC system 350 and a DSP component 360. The DDC system 350 may include a digitizer 352 (e.g., ADC), a digital mixer 354 (e.g., a direct digital synthesizer (DDS), digital multipliers), a low pass filter 356, and a down-sampler 358. In some implementations, DSP system 318 may include circuits or one or more processors (e.g., processor 510 in FIG. 5) configured to perform demodulation, decoding, and related tasks. These circuits may be generally based on application-specific ICs (ASICs), field-programmable gate arrays (FPGAs) and programmable DSP devices.

Referring to FIG. 3A, the laser 302 may generate a beam which is oscillated by the local oscillator 312 to output an optical LO signal. In some implementations, the frequency shifting optical modulator 304 may determine a frequency offset ($f_O$) between a transmit (TX) optical signal and the optical LO signal, generate an optical signal with its frequency shifted from the LO frequency by the frequency offset ($f_O$), and perform modulation (e.g., IQ modulation) of the frequency-shifted optical signal (hereinafter referred to as "$f_O$-shifted waveform") based on a data signal (e.g., I/Q data signal) to generate a transmit (TX) optical waveform 305. In some implementations, the frequency shifting optical modulator 304 may generate a $f_O$-shifted waveform using a plurality of methods. The methods may include (1) optical single-sideband generation using a nested Mach-Zehnder electro-optic modulator, (2) serrodyne shifting with an electro-optic modulator, (3) optical phase-lock loop with two separate lasers, (4) optical injection locking with two separate lasers, or (5) using acousto-optic modulators.

The circulator optics 306 may receive the TX optical waveform 305, which is input to the scanner 308 as a TX signal. The TX signal may be transmitted through the scanner 308 to illuminate an object 310 (or an area of interest). The scanner 308 may receive a return optical signal reflected by the object 310 as a receive (RX) optical signal. In some implementations, the optical mixer 314 may mix the RX optical signal with an optical LO signal 313 to produce an optical signal, which may be then detected by the detector 316 and further delivered to the DDC system 350 of the DSP system 318 as analog data input 349 (see FIG. 3B).

Referring to FIG. 3B, the digitizer 352 of the DDC system 350 may digitize the analog data input to output a digital signal of interest which includes strictly positive frequency content because the RX optical signal may have a frequency range that has been shifted by the frequency offset ($f_O$) from the LO frequency. The digital mixer 354 of the DDC system 350 may extract a full complex signal (e.g., I/Q components) from the digital signal by digitally mixing the digital signal to produce I data and Q data and recombine the I/Q data into a complex signal (not shown). In some implementations, if s(t) and s'(t) denote the original digital signal and the complex signal, respectively, and I(t) and Q(t) denote the I data and Q data, respectively, the DDC system 350 may perform the step of generating the complex signal s'(t) according to Equation 4 to Equation 6. For example, the digital mixer 354 may digitally mix the digital signal s(t) based on the frequency offset $f_O$ to generate I data and Q data according to Equation 4 and Equation 5. The low pass filter 356 may further process the I data and Q data to eliminate a high-frequency component. The down-sampler (or decimator) 358 may down-sample (or decimate) the output of the low pass filter 356 to reduce the sample rate of the I data and Q data. After performing LPF and/or down-sampling, The DDC system 350 may recombine the I/Q data into the complex signal s'(t) and further deliver the s'(t) signal to the DSP component 360. The DSP component 360 may perform further processing (e.g., bandpass filtering and/or down-sampling) on the s'(t) signal as dictated by signal processing needs.

In some implementations, the DSP system 318 can further process (e.g., correlate) the transmitted/returned signals to identify a location of a peak in the return signal. While it is discussed in greater detail with respect to FIG. 4, the DSP system 318 can determine correlation data between the transmitted signal and the return signal, identify the location of the peak, and convolve the correlation data with a predetermined function.

Figure 3C:
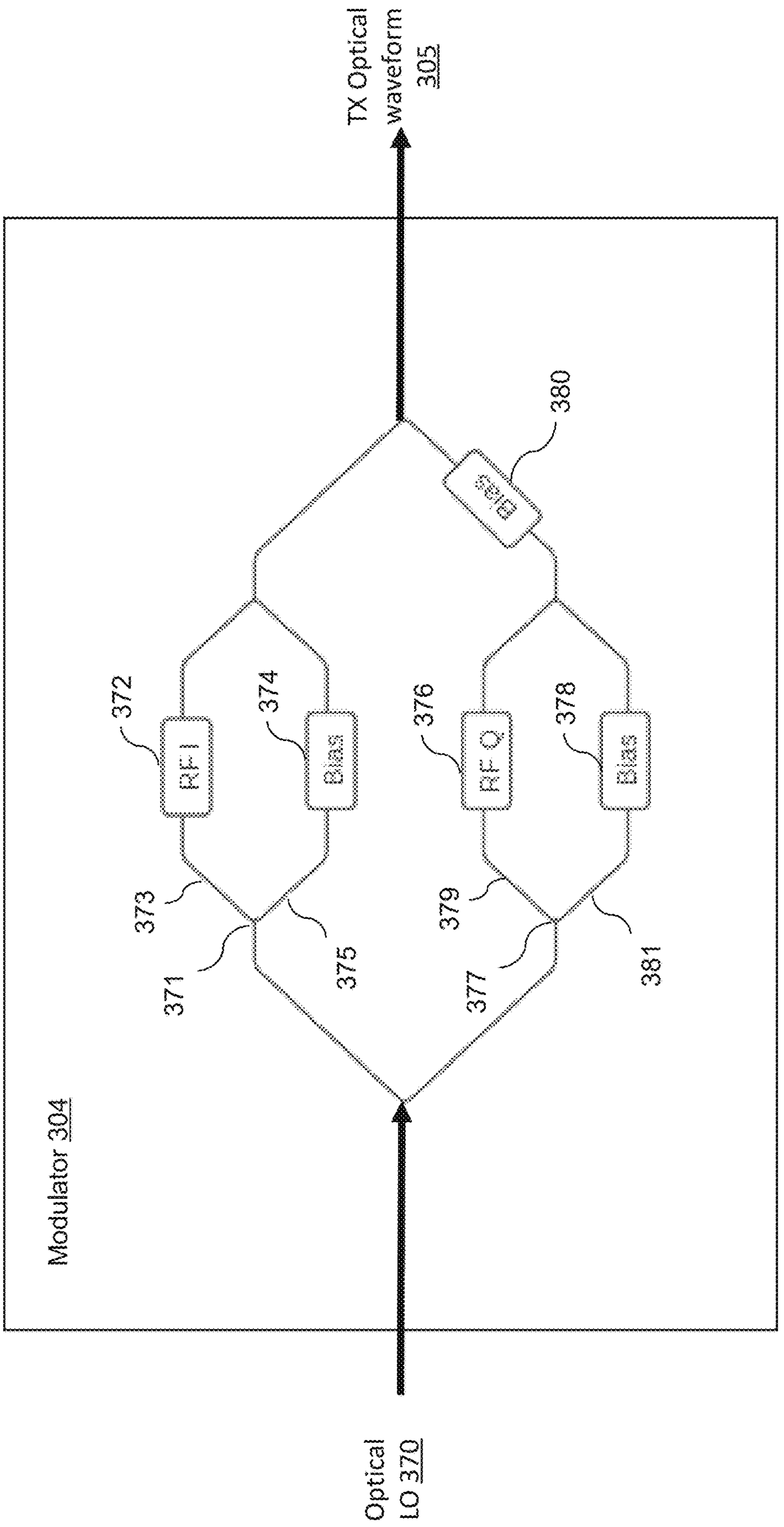
FIG. 3C is a block diagram illustrating an example of a modulator in a lidar sensor system, according to some implementations.

FIG. 3C is a block diagram illustrating an example of a frequency shifting modulator 304 in a lidar sensor system, according to some implementations. In some implementations, the modulator 304 (see FIG. 3A) may be a nested Mach-Zehnder electro-optic modulator (e.g., optical IQ modulator or QPSK modulator; hereinafter referred to as "nested MZ modulator"). In some implementations, a nested MZ modulator may provide complete digital control and/or single step upshifting and waveform modulation to flexibly perform a single sideband generation of a $f_O$-shifted waveform.

Referring to FIG. 3C, the nested MZ modulator 304 may include a first MZ modulator and a second MZ modulator. In some implementations, the first MZ modulator may include an input waveguide 371 and two waveguide interferometer arms 373, 375 such that the input waveguide 371 is split up into the two arms 373, 375. Similarly, the second MZ modulator may include an input waveguide 377 and two waveguide interferometer arms 379, 381 such that the input waveguide 377 is split up into the two arms 379, 381.

Referring to FIG. 3A and FIG. 3C, the nested MZ modulator 304 may receive an input LO signal 370 from the local oscillator 312 which is split to two branches to the first MZ modulator and the second MZ modulator, modulate the input LO signal 370 based on I data 372 and Q data 376, and output the modulated TX optical waveform 305 with the frequency offset $f_O$. The nested MZ modulator 304 may apply the I data 372 and the Q data 376 onto the arm 373 of the first MZ modulator and the arm 379 of the second MZ modulator, respectively. In some implementations, two arms 375, 381 may be biased with bias voltages 374, 378, respectively, such that the bias voltages 374, 378 satisfy the single sideband modulation (SSB) conditions. In some implementations, a bias voltage 380 may be applied to an output terminal of the second MZ modulator to maintain a frequency offset (e.g., frequency offset $f_O$) between the optical LO signal 370 and the modulated TX optical waveform 305.

Figure 3D:
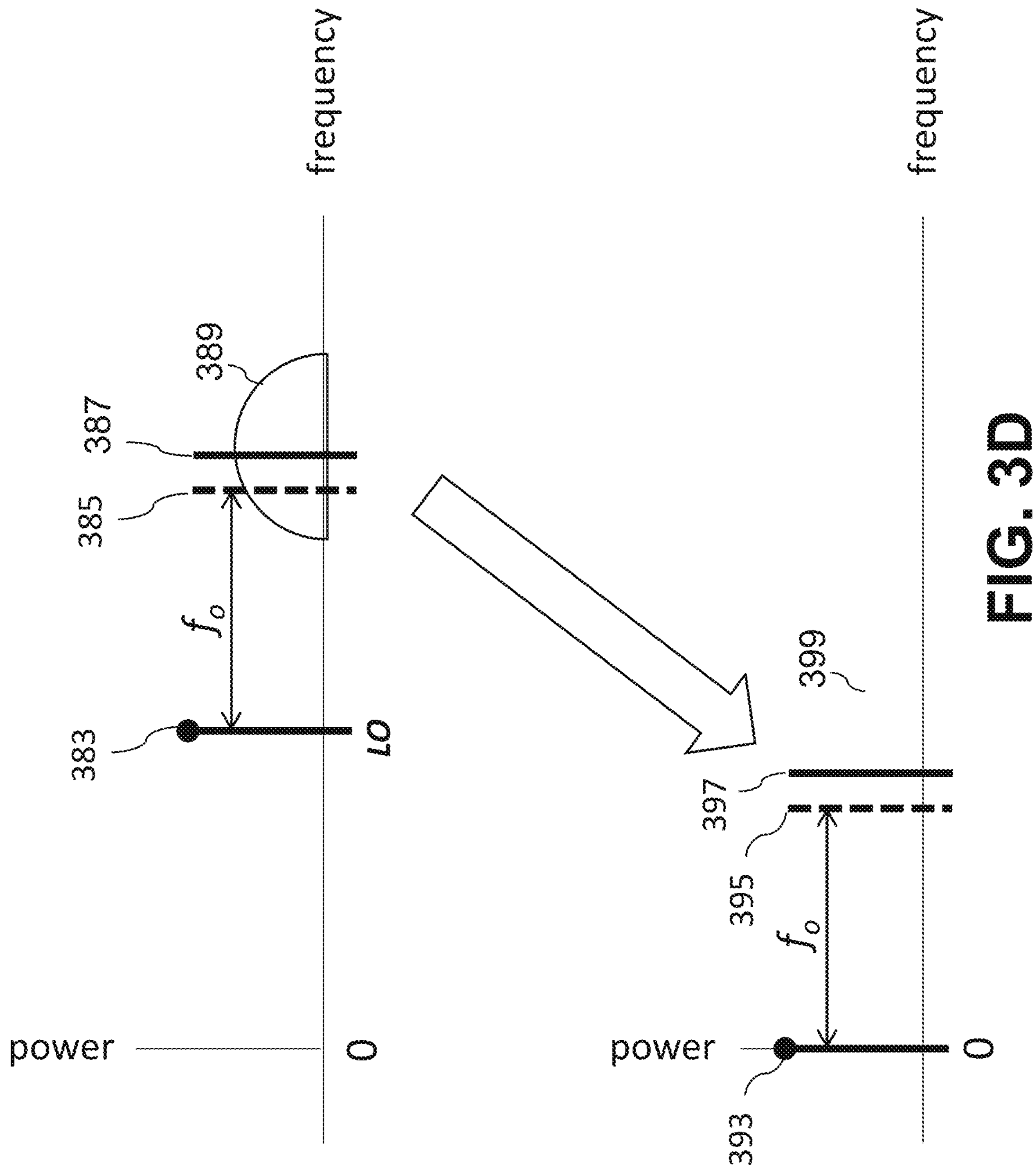
FIG. 3D is a block diagram illustrating an example of down converting a signal to a lower frequency signal with a frequency offset, according to some implementations.

FIG. 3D is a block diagram illustrating an example of down converting a signal to a lower frequency signal with a frequency offset, according to some implementations.

For example, a lidar sensor system (e.g., LIDAR sensor system 300) may perform IQ modulation of an LO signal having an LO frequency 383 based on an I/Q data stream to produce a modulated waveform with a frequency offset (e.g., frequency offset $f_O$), transmit the modulated waveform as a transmit (TX) signal (e.g., TX optical waveform 305), and receive a receive (RX) signal 389 reflected from an object (e.g., optical return signal reflected from object 310). The RX signal 389 may have a center frequency 387 and the frequency range of the RX signal 389 may include a frequency 385 which is away from the LO frequency 383 by the frequency offset $f_O$. A DSP system (e.g., DDC system 350) of the lidar sensor system may down convert the RX signal 389 by the frequency offset $f_O$ towards a DC frequency 393 to output a down-converted signal 399 having a center frequency 397. The frequency range of the down-converted signal 399 may include a frequency 395 which is away from the DC frequency 393 by the frequency offset $f_O$.

As shown in FIG. 3D, the frequency range of the RX signal 389 may not overlap with a region crossing through the LO frequency 383. Moreover, the range of the down-converted signal may not be around the DC frequency 393, including only positive frequencies. In other words, the RX signal 389 in the upper sideband may be down converted only to a positive frequency range which is away from the DC frequency by approximately the frequency offset $f_O$. Therefore, as shown in FIG. 3D, digital down conversion according to some implementations (e.g., DDC by DDC system 350 in FIG. 3B) can make the information carried by the RX signal 389 more clearly, thereby more accurately measuring or detecting the phase difference between the TX signal and the RX signal. Moreover, because the RX signal 389 lies only in the positive frequency range, e.g., away from the DC frequency 393 by approximately the frequency offset $f_O$, the detectors (e.g., detectors 416) may not suffer from an artifact at the zero (DC) frequency due to electronic 1/f noise and a flat frequency response of the detectors.

5. Systems and Methods for Lidar Measurement with Reduced Peak-Fitting Bias

According to present disclosure, the LIDAR sensor systems can improve measurements and/or detections, by reducing a peak-fitting bias.

When a return signal does not match a transmitted signal (e.g., biased, in the timing, frequency, wavelength, etc.), a LIDAR sensor system should filter (e.g., remove, ignore, etc.) out those data points. A peak-fitting method may be used to examine a neighboring subset of peaks and then estimate a true location of a peak. However, the performance of such a peak-fitting method can be reduced when, for example, the signals contain noise. Moreover, the performance may be even worse (e.g., more biased) with a low SNR condition, particularly when correlating an impulse signal and the neighboring bins are non-zero as a result of a response of the processing system (e.g., FFT).

The present disclosure provides techniques for the peak-fitting bias. In some implementations, the correlation between the transmitted signal and the return signal may be an impulse or approximately an impulse. The sifting property of the impulse allows for a convolution with any arbitrary function (or a predetermined function; e.g., Gaussian), and thus allows for use of a peak-fitting method optimized for the arbitrary function. According to some illustrative implementations, the LIDAR sensor systems disclosed herein can determine correlation data between the transmitted signal and the return signal, identify, in the correlation data, an initial location of a peak, and can convolve the correlation data with a predetermined function. In some implementations, the predetermined function may be a Gaussian function, a Lorentzian function, a polynomial function, or a raised cosine, can be selected based on the SNR conditions. This allows for the location of the peak to be identified more accurately, which contributes to accuracy and reliability of the LIDAR sensor systems. Moreover, in some implementations, this can maximize pulse compression and PSLR with impulse-like autocorrelation functions.

Figure 4:
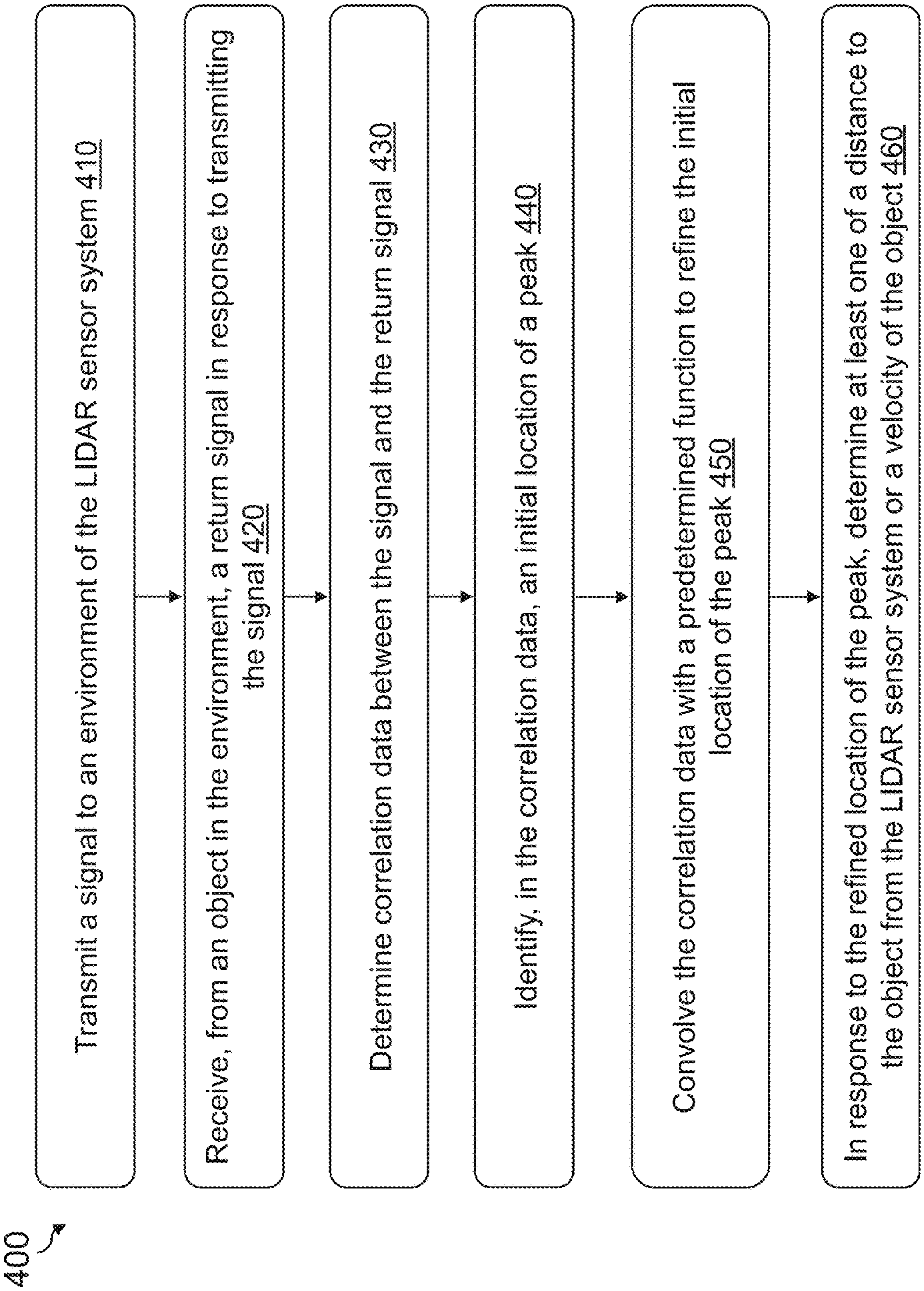
FIG. 4 is a flowchart of an example method for a lidar sensor system, according to some implementations.

FIG. 4 is a flowchart of an example method 400 for a lidar sensor system, according to some implementations. The method 400 is merely an example and is not intended to limit the present disclosure. Accordingly, it is understood that additional operations may be provided before, during, and after the method 400. The method 400 can be performed with at least one of the components discussed with respect to FIG. 1 to FIG. 3 and FIG. 5. For example, the method 400 can be performed with the LIDAR sensor system 300.

At operation 410, an electronic module of a LIDAR sensor system (e.g., 300) can control a transmitter (e.g., scanner 308) to transmit an optical signal to an environment. In some implementations, the transmitted optical signal may include a sequence of signals (e.g., phases, phase changes), as discussed with respect to FIG. 2C. In some implementations, the transmitted signal may include an impulse signal. For example, the transmitted signal may be a sequence of impulse signals.

At operation 420, in response to transmitting the optical signal, the electronic module can receive a returned optical signal that is reflected from an object (e.g., 310) in the environment. For example, the electronic module can receive the returned optical signal through a receiver (e.g., scanner 308) and/or circulator optics (e.g., circulator optics 306). In some implementations, for example when the transmitted optical signal includes a sequence of signals (e.g., phases, phase changes), the returned optical signal can include a sequence of signals (e.g., phases, phase changes), which can be correlated with the sequence of signals in the transmitted signals.

At operation 430, the LIDAR sensor system 300 (e.g., the DSP system 318) can determine correlation data between the signal (e.g., the transmitted signal) and the return signal. For example, the DSP system 318 can determine the correlation data (e.g., cross correlation as discussed above). In some implementations, the correlation data includes an impulse signal or impulse-like signal.

At operation 440, the LIDAR sensor system 300 (e.g., the DSP system 318) can identify, in the correlation data, an initial location of a peak. In some implementations, the initial location of the peak can be identified in a time domain. In some implementations, the initial location of the peak can be identified in a frequency domain. The correlation data can be analyzed to identify where the peak occurs, for example, as discussed with respect to FIG. 2C to FIG. 2E.

At operation 450, the LIDAR sensor system 300 can convolve the correlation data with a predetermined function to refine the initial location of the peak. As used herein, "convolving" refers to applying a predetermined function (e.g., which improves the peak-fitting performance) to the correlation data. In some implementations, the predetermined function is one of: a Gaussian function, a Lorentzian function, a polynomial function, or a raised cosine. In some implementations, the LIDAR sensor system 300 can select the predetermined function based on signal to noise ratio (SNR). In some implementations, the LIDAR sensor system 300 can parameterize the predetermined function (e.g., adjust a parameter of the predetermined function) based on the SNR. For example, the LIDAR sensor system 300 can generate the predetermined function (e.g., Gaussian) based on a set of parameters (e.g., a location of Gaussian peak, a width of Gaussian peak, etc.) based on the SNR. In some implementations, the predetermined function can be determined based on historical data. For example, the LIDAR sensor system 300 can determine the predetermined function and/or parameter based on data stored in the system (e.g., ADC). In some implementations, the LIDAR sensor system 300 can convolve the correlation data in a frequency domain. In some implementations, the LIDAR sensor system 300 can convolve the correlation data in a time domain.

In some implementations, the one or more processors are configured to perform a peak fitting corresponding to the predetermined function, thereby refining the initial location of the peak. For example, the one or more processors can perform one of a plurality of peak fitting methods that is optimized (e.g., lowest SNR) for the predetermined function. For example, when the predetermined function is Gaussian, the one or more processors can perform a log-polynomial fitting.

In some implementations, although FIG. 4 shows operation 450 performed after operation 430, operation 450 of convolving the correlation data can be performed before operation 430 of determining the correlation data. For example, the one or more processors can perform a convolution on the transmitted signal and/or the return signal with a predetermined function, and determine the correlation data between the transmitted signal and the return signal. Then, the one or more processors can identify the initial location of the peak in the correlation data. In some implementations, the one or more processors are configured to perform a peak fitting to refine the initial location of the peak. For example, when the predetermined function is Gaussian, the one or more processors can perform a log-polynomial fitting.

At operation 460, one or more processors (e.g., processor 510) can determine at least one of a distance to or a velocity of the object in the environment, in response to an identification of the peak (e.g., calculating range R to the object using Equations 3A, 3B).

Figure 5:
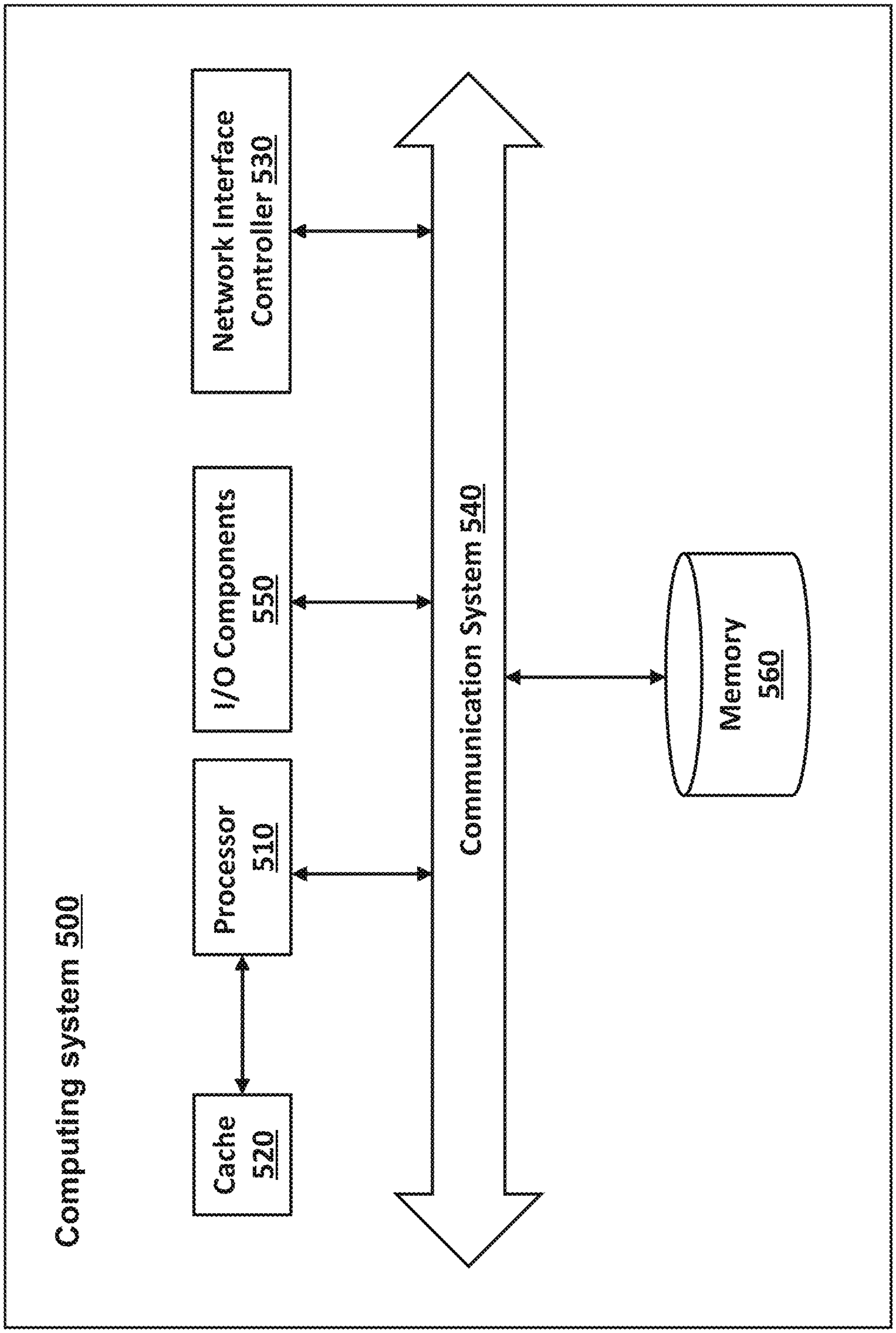
FIG. 5 is a block diagram illustrating an example of a computing system, according to some implementations.

FIG. 5 is a block diagram illustrating an example of a computing system 500 according to some implementations.

Referring to FIG. 5, the illustrated example computing system 500 includes one or more processors 510 in communication, through a communication system 540 (e.g., bus), with memory 560, at least one network interface controller 530 with network interface port for connection to a network (not shown), and other components, e.g., an input/output ("I/O") components interface 550 connecting to a display (not illustrated) and an input device (not illustrated). Generally, the processor(s) 510 will execute instructions (or computer programs) received from memory. The processor(s) 510 illustrated incorporate, or are directly connected to, cache memory 520. In some instances, instructions are read from memory 560 into the cache memory 520 and executed by the processor(s) 510 from the cache memory 520.

In more detail, the processor(s) 510 may be any logic circuitry that processes instructions, e.g., instructions fetched from the memory 560 or cache 520. In some implementations, the processor(s) 510 are microprocessor units or special purpose processors. The computing device 500 may be based on any processor, or set of processors, capable of operating as described herein. The processor(s) 510 may be single core or multi-core processor(s). The processor(s) 510 may be multiple distinct processors.

The memory 560 may be any device suitable for storing computer readable data. The memory 560 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 500 may have any number of memory devices as the memory 560.

The cache memory 520 is generally a form of computer memory placed in close proximity to the processor(s) 510 for fast read times. In some implementations, the cache memory 520 is part of, or on the same chip as, the processor(s) 510. In some implementations, there are multiple levels of cache 520, e.g., L2 and L3 cache layers.

The network interface controller 530 manages data exchanges through the network interface (sometimes referred to as network interface ports). The network interface controller 530 handles the physical and data link layers of the OSI model for network communication. In some implementations, some of the network interface controller's tasks are handled by one or more of the processor(s) 510. In some implementations, the network interface controller 530 is part of a processor 510. In some implementations, a computing system 500 has multiple network interfaces controlled by a single controller 530. In some implementations, a computing system 500 has multiple network interface controllers 530. In some implementations, each network interface is a connection point for a physical network link (e.g., a cat-5 Ethernet link). In some implementations, the network interface controller 530 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 530 implements one or more network protocols such as Ethernet. Generally, a computing device 500 exchanges data with other computing devices through physical or wireless links through a network interface. The network interface may link directly to another device or to another device through an intermediary device, e.g., a network device such as a hub, a bridge, a switch, or a router, connecting the computing device 500 to a data network such as the Internet.

The computing system 500 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 500 may include an interface (e.g., a universal serial bus (USB) interface) for connecting input devices, output devices, or additional memory devices (e.g., portable flash drive or external media drive). In some implementations, a computing device 500 includes an additional device such as a co-processor, e.g., a math co-processor can assist the processor 510 with high precision or complex calculations.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed:

1. A LIDAR sensor system comprising:

one or more processors; and one or more computer-readable storage mediums storing instructions which, when executed by the one or more processors, cause the one or more processors to:

transmit a signal to an environment of the LIDAR sensor system;

receive, from an object in the environment, a return signal in response to transmitting the signal;

determine correlation data between the signal and the return signal;

identify, in the correlation data, an initial location of a peak;

convolve the correlation data with a predetermined function to refine the initial location of the peak to correct for peak-fitting bias in the correlation data between the signal and the return signal;

in response to the refined location of the peak, determine at least one of a distance to the object from the LIDAR sensor system or a velocity of the object;

plan a trajectory for a vehicle based on the at least one of the distance to the object from the LIDAR sensor system or the velocity of the object; and control one or more vehicle control systems to implement the trajectory and control the vehicle in accordance with the trajectory.

2. The LIDAR sensor system of claim 1, wherein the correlation data includes an impulse signal.

3. The LIDAR sensor system of claim 1, wherein the predetermined function is one of: a Gaussian function, a Lorentzian function, a polynomial function, or a raised cosine.

4. The LIDAR sensor system of claim 1, wherein the one or more processors are configured to adjust the predetermined function based on signal to noise ratio.

5. The LIDAR sensor system of claim 4, wherein in refining the initial location of the peak, the one or more processors are configured to perform a peak fitting corresponding to the predetermined function.

6. The LIDAR sensor system of claim 5, wherein the predetermined function is Gaussian, and the peak fitting is a log-polynomial fitting.

7. The LIDAR sensor system of claim 1, wherein the predetermined function is determined based on historical data.

8. The LIDAR sensor system of claim 1, wherein convolving the correlation data with the predetermined function is performed in a frequency domain.

9. An autonomous vehicle control system comprising:

one or more processors; and one or more computer-readable storage mediums storing instructions which, when executed by the one or more processors, cause the one or more processors to:

transmit a signal to an environment of a LIDAR sensor system;

receive, from an object in the environment, a return signal in response to transmitting the signal;

determine correlation data between the signal and the return signal;

identify, in the correlation data, an initial location of a peak;

convolve the correlation data with a predetermined function to refine the initial location of the peak to correct for peak-fitting bias in the correlation data between the signal and the return signal;

in response to the refined location of the peak, determine at least one of a distance to the object from the LIDAR sensor system or a velocity of the object;

plan a trajectory for a vehicle based on the at least one of the distance to the object from the LIDAR sensor system or the velocity of the object; and control one or more vehicle control systems to implement the trajectory and control the vehicle in accordance with the trajectory.

10. The autonomous vehicle control system of claim 9, wherein the correlation data includes an impulse signal.

11. The autonomous vehicle control system of claim 9, wherein the predetermined function is one of: a Gaussian function, a Lorentzian function, a polynomial function, or a raised cosine.

12. The autonomous vehicle control system of claim 9, wherein the one or more processors are configured to adjust the predetermined function based on signal to noise ratio.

13. The autonomous vehicle control system of claim 12, wherein in refining the initial location of the peak, the one or more processors are configured to perform a peak fitting corresponding to the predetermined function.

14. The autonomous vehicle control system of claim 13, wherein the predetermined function is Gaussian, and the peak fitting is a log-polynomial fitting.

15. The autonomous vehicle control system of claim 9, wherein the predetermined function is determined based on historical data.

16. The autonomous vehicle control system of claim 9, wherein convolving the correlation data with the predetermined function is performed in a frequency domain.

17. An autonomous vehicle comprising:

a LIDAR sensor system, comprising:

one or more processors; and one or more computer-readable storage mediums storing instructions which, when executed by the one or more processors, cause the one or more processors to:

transmit a signal to an environment of the LIDAR sensor system;

receive, from an object in the environment, a return signal in response to transmitting the signal;

determine correlation data between the signal and the return signal;

identify, in the correlation data, an initial location of a peak;

convolve the correlation data with a predetermined function to refine the initial location of the peak to correct for peak-fitting bias in the correlation data between the signal and the return signal;

in response to the refined location of the peak, determine at least one of a distance to the object from the LIDAR sensor system or a velocity of the object;

plan a trajectory for a vehicle based on the at least one of the distance to the object from the LIDAR sensor system or the velocity of the object; and control one or more vehicle control systems to implement the trajectory and control the vehicle in accordance with the trajectory, wherein the one or more vehicle control systems comprise:

a steering system;

a braking system; and a vehicle controller comprising one or more processors configured to control operation of at least one of the steering system or the braking system based at least in part on a determination of the at least one of the distance or the velocity of the object in the environment.

18. The autonomous vehicle of claim 17, wherein the correlation data includes an impulse signal.

19. The autonomous vehicle of claim 17, wherein the predetermined function is one of: a Gaussian function, a Lorentzian function, a polynomial function, or a raised cosine.

20. The autonomous vehicle of claim 17, wherein the one or more processors are configured to adjust a parameter of the predetermined function.

* * * * *